United States Patent [19]

Ishihara et al.

[11] Patent Number: 5,151,234
[45] Date of Patent: Sep. 29, 1992

[54] METHOD FOR THE MANUFACTURE OF THERMOPLASTIC RESIN SHEETS

[75] Inventors: Makoto Ishihara, Ohtsu; Kazuhiro Kiminami, Kusatsu; Masakazu Wakabayashi; Hirokazu Hori, both of Shiga; Saneharu Tatsu; Sachio Takeshita, both of Shiga, all of Japan

[73] Assignee: Sekisui Kagaku Kogyo Kabushiki Kaisha, Osaka, Japan

[21] Appl. No.: 500,988

[22] Filed: Mar. 29, 1990

[30] Foreign Application Priority Data

Mar. 31, 1989 [JP] Japan .................................. 1-83315
Mar. 31, 1989 [JP] Japan .................................. 1-83316

[51] Int. Cl.$^5$ .............................................. B29C 47/92
[52] U.S. Cl. .................................. 264/176.1; 264/40.6; 264/169; 425/378.1; 425/461
[58] Field of Search ............. 264/176.1, 211.21, 209.7, 264/284, 169, 40.6, 178 R; 425/378.1, 379.1, 461, 71

[56] References Cited

U.S. PATENT DOCUMENTS

| | | | |
|---|---|---|---|
| 2,876,497 | 3/1959 | Alexander | 264/209.7 |
| 2,904,844 | 9/1959 | Smithies | 264/284 |
| 2,909,810 | 10/1959 | Jensch . | |
| 2,991,508 | 7/1961 | Fields et al. | 264/211.21 |
| 3,382,535 | 5/1968 | Ferrari | 425/461 |
| 3,415,796 | 12/1968 | Souder | 264/209.7 |
| 3,574,808 | 4/1971 | Matthews et al. | 264/209.8 |
| 3,920,782 | 11/1975 | Cogswell | 264/176.1 |
| 3,994,654 | 11/1976 | Chyu | 264/176.1 |
| 4,485,062 | 11/1984 | Dawes et al. | 264/176.1 |
| 4,575,540 | 3/1986 | Cartier . | |
| 4,768,939 | 9/1988 | Bourcier et al. | 425/71 |
| 4,808,357 | 2/1989 | Bourcier et al. | 264/178 R |

FOREIGN PATENT DOCUMENTS

| | | |
|---|---|---|
| 0185863 | 7/1986 | European Pat. Off. . |
| 56-95637 | 8/1981 | Japan . |
| 58-12743 | 1/1983 | Japan . |
| 61-61835 | 3/1986 | Japan . |
| 61-154919 | 7/1986 | Japan . |

Primary Examiner—Jeffery Thurlow
Attorney, Agent, or Firm—Armstrong & Kubovcik

[57] ABSTRACT

A method for the manufacture of thermoplastic resin sheets, including extruding molten thermoplastic resin at an extrusion velocity V through a slit provided in an extrusion mold so as to form thermoplastic resin sheets with embossed surfaces, wherein said thermoplastic resin is extruded from said slit in said extrusion mold under conditions such that the ratio V/H of said extrusion velocity V to the width H of said slit exceeds a critical value $(V/H)c$, said critical value $(V/H)c$ being the ratio of the extrusion velocity to the width of the mold slit corresponding minimum value of the roughness of the embossment formed on the surface of said thermoplastic resin sheets, whereby defects such as the adhesion to and winding onto rollers, inferior appearance and sizing marks which are prone to occur when the sheets are embossed with embossing rollers.

4 Claims, 5 Drawing Sheets

Fig.7
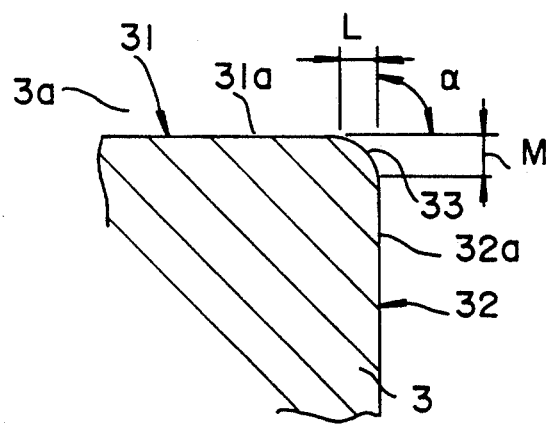
Fig.8a
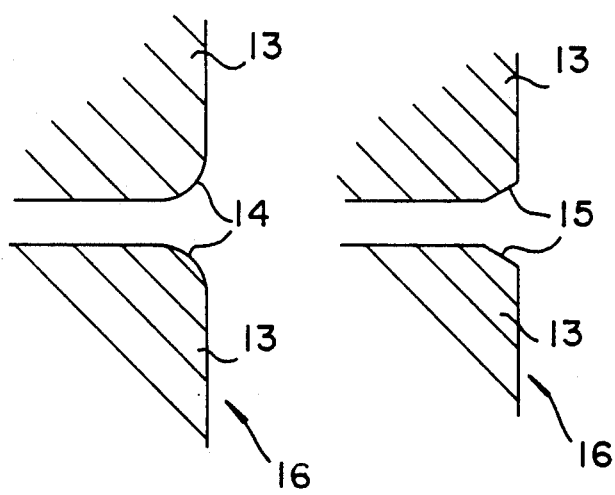
Fig.8b
Fig.9a
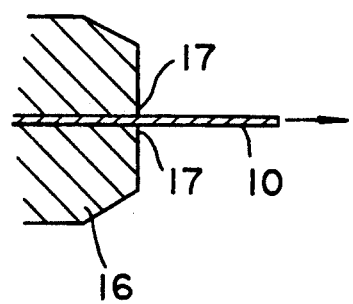
Fig.9b
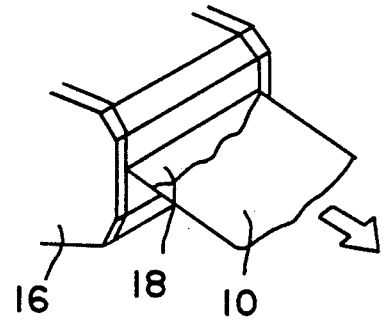

METHOD FOR THE MANUFACTURE OF THERMOPLASTIC RESIN SHEETS

BACKGROUND OF THE INVENTION

1. Field of the Invention

The present invention relates to a method for the manufacture of thermoplastic resin sheets with embossed surfaces. More particularly, it relates to a method for the manufacture of the type of thermoplastic resin sheets suitable for use in the laminated glass products which are widely applied in the automotive, aircraft, construction and other industries.

2. Description of the Prior Art

Laminated glass is fabricated by interposing a thermoplastic resin sheet as an intermediate layer between two plates of glass, and then applying pressure thereto. In the manufacture of laminated glass, the air between the glass plates and the resin sheet must be adequately expelled, and therefore thermoplastic resin sheets with embossed surfaces are employed.

The following methods have been proposed for the manufacture of thermoplastic resin sheets with embossed surfaces.

(1) First, a thermoplastic resin sheet with a flat surface is manufactured by means of an extruder or mold. Then, an embossed pattern is impressed upon the surface of this sheet by passage between a pair of embossing rollers (Japanese Laid-Open Patent Publication No. 61-61835).

(2) A resin composition containing 0.6–15% by weight of water is extruded from an extruder, and compressed in a mold, resulting in an embossed sheet (U.S. Pat. No. 2,904,844).

(3) The lips of an extrusion mold are maintained at a temperature lower than that of the resin being extruded from these lips, thereby creating a temperature difference between the inside and outside of the resin. A desired sheet is obtained by extruding molten resin from the lips under these conditions (Japanese Laid-Open Patent Publication No. 61-154919).

In the aforesaid method (1), if the thermoplastic resin possesses high tack, then, when passing between the embossing rollers, the sheet may adhere and wind onto the rollers, thus causing malfunctions in the manufacturing process. Since it is difficult for the sheet to be detached from the embossing rollers, blemishes are formed and the appearance of the sheet deteriorates. Moreover, when wide sheets are manufactured by this process, large rollers of width exceeding that of the sheets are required, which entails high equipment expenditures and running costs.

In the aforesaid method (2), since the resin contains water, this water may cause foaming of the sheet. If dehydration adequate to prevent the foaming of the sheet is performed within the extruder, then the embossment of the sheet so obtained is not sufficiently rough.

As for the aforesaid method (3), the lip of the extrusion mold must be cooled sufficiently to ensure that the temperature difference between the resin and the lip is approximately 40° C. Therefore, cooling ducts must be incorporated into the mold, which makes the structure of the mold complex, and moreover, temperature regulation devices must also be provided in the mold, which makes equipment costs for this process high.

When the lips are finished by lapping or polishing, if the edges of the lips on the side of the resin extrusion orifice are unduly sharp, then chipping or burrs are prone to occur, and therefore, as shown in FIGS. 8a and 8b, the edges of the lips 13 are generally rounded 14 or bevelled 15. However, if sheets are fabricated by extrusion of a tacky thermoplastic resin (e.g., polyvinyl butyral or ethylene vinyl acetate copolymers) from a mold 16 such that the lips 13 have been rounded 14 or bevelled 15, then, as indicated in FIG. 9a, scraps of resin (lip debris) 17 adhere to the edges of the lips of the mold 16. If these scraps 17 accumulate on the edges of the lips 13, as shown in FIG. 9b, this develops into so-called lip residue 18, and this residue 18 adheres to the sheet 10 extruded from the slit, resulting in the production of defective sheets 10. Therefore, the lips 13 of the mold 16 must be adequately cleaned to avoid adhesion of lip debris 17 to the sheets 10, which entails a substantial drop in productivity.

The following methods have been proposed in order to prevent adhesion of resin scraps to the lips.

(4) An anti-adhesive solution composed of fluorocarbon resin or other suitable substance is applied to the surfaces of the lips (Japanese Laid-Open Patent Publication No. 58-12743).

(5) Anti-adhesive parts composed of tetrafluoroethylene resin are attached to the edges of the lips (Japanese Laid-Open Patent Publication No. 56-95637).

In the aforesaid method (4), since a special process is required for the application of an anti-adhesive solution to the lip surfaces, the cost of the molds is increased. Likewise, in the aforesaid method (5), the attachment of anti-adhesive parts to the mold requires special work, thereby raising the cost of the mold, and moreover, the cleaning of the lips becomes difficult.

SUMMARY OF THE INVENTION

The present inventors have discovered a specific phenomenon which permits the fabrication of sheets with excellent surface embossment, suitable, for example, for the intermediate layer of laminated safety glass, by extrusion forming of sheets composed, in particular, of polyvinyl butyral or a similar thermoplastic resin, wherein by the said thermoplastic resin is extruded under conditions such that the ratio of the extrusion velocity of the resin to the width of the slit of an extrusion mold exceeds a certain prescribed value. On the basis of this discovery, the present invention, which eliminates the above-mentioned shortcomings of conventional methods, was successfully completed.

The method for manufacture of thermoplastic resin sheets of the present invention is a method comprising extruding molten thermoplastic resin at an extrusion velocity $V$ through a slit provided in an extrusion mold so as to form thermoplastic resin sheets with embossed surfaces, wherein the said thermoplastic resin is extruded from the said slit in the said extrusion mold under conditions such that the ratio $V/H$ of the said extrusion velocity $V$ to the width $H$ of the said slit exceeds a critical value $(V/H)c$, the said critical value $(V/H)c$ being the ratio of the extrusion velocity to the width of the mold slit corresponding to the minimum value of the roughness of the embossment formed on the surface of the said thermoplastic resin sheets at which the roughness of the said embossment begins to increase after initially decreasing when the said thermoplastic resin sheet is fabricated under conditions where the said ratio $V/H$ is progressively increased.

In a preferred embodiment, the ratio V/H of said extrusion velocity V to said slit width H lies in the range exceeding said critical value (V/H)c but not exceeding 1.4 times said critical value (V/H)c.

In a more preferred embodiment, the ratio V/H of said extrusion velocity V to said slit width H lies in the range exceeding said critical value (V/H)c but not exceeding 1.2 times said critical value (V/H)c.

In a still more preferred embodiment, the thermoplastic resin is polyvinyl butyral.

In a still more preferred embodiment, the angle between the face contiguous with the resin flow channel and the outside surface of the end of a lip of said extrusion mold is approximately 90°, and the corner at the intersection of the face contiguous to said resin flow channel and the outside surface of said lip is not rounded nor bevelled.

The invention described herein makes possible the objectives of:

(1) providing a method for the manufacture of thermoplastic resin sheets with embossed surfaces which eliminates defects such as the adhesion to and winding onto rollers, inferior appearance and sizing marks which are prone to occur when the sheet is embossed with embossing rollers;

(2) providing a method for the manufacture of thermoplastic resin sheets with embossed surfaces, such that foaming does not occur in the manufacturing process;

(3) providing a method for the manufacture of thermoplastic resin sheets with embossed surfaces which can be implemented using conventional general purpose molds, without the necessity for molds of complex structure or the installation of supplementary temperature regulating devices, etc.;

(4) providing a method for the manufacture of thermoplastic resin sheets with embossed surfaces which permits substantial reduction of equipment expenditures and running costs;

(5) providing a method for the manufacture of thermoplastic resin sheets, wherein the formation of lip debris can be inhibited merely by appropriate finishing of the lip edges, without applying anti-adhesive solutions to lip surfaces or attachment of anti-adhesive parts; and (6) providing a method for the manufacture of thermoplastic resin sheets with embossed surfaces, which, by reducing the adhesion of lip debris to the sheets, permits a substantial prolongation of the period elapsed before cleaning of the lips is required.

BRIEF DESCRIPTION OF THE DRAWINGS

This invention may be better understood and its numerous objects and advantages will become apparent to those skilled in the art by reference to the accompanying drawings as follows:

FIG. 7 is a cross-sectional view showing the lips of the extrusion mold of the present invention.

FIGS. 8a and 8b are cross-sectional views showing the lips of conventional extrusion molds.

FIGS. 9a and 9b are cross-sectional and perspective views, respectively, of a conventional type of extrusion mold.

DESCRIPTION OF THE PREFERRED EMBODIMENTS

In the procedure of the present invention, the velocity V of extrusion of the thermoplastic resin through the slit of the extruder is determined by the following formula (1).

$$\text{Extrusion velocity } V = \text{extrusion volume rate of molten resin/[breadth of mold slit} \times \text{width } H \text{ of mold slit]} \quad (1)$$

The units used in formula (1) are cm/sec for extrusion velocity V, $cm^3$/sec for extrusion volume rate, cm for slit breadth, and cm for slit width H.

The ratio V/H of the extrusion velocity V to the slit width H can be varied by changing the slit width H and/or the extrusion velocity V of the resin. For example, to raise the value of V/H, the extrusion velocity V can be increased and/or the slit width H can be narrowed. Conversely, to lower the value of V/H, the opposite adjustments can be performed.

Figure 1:
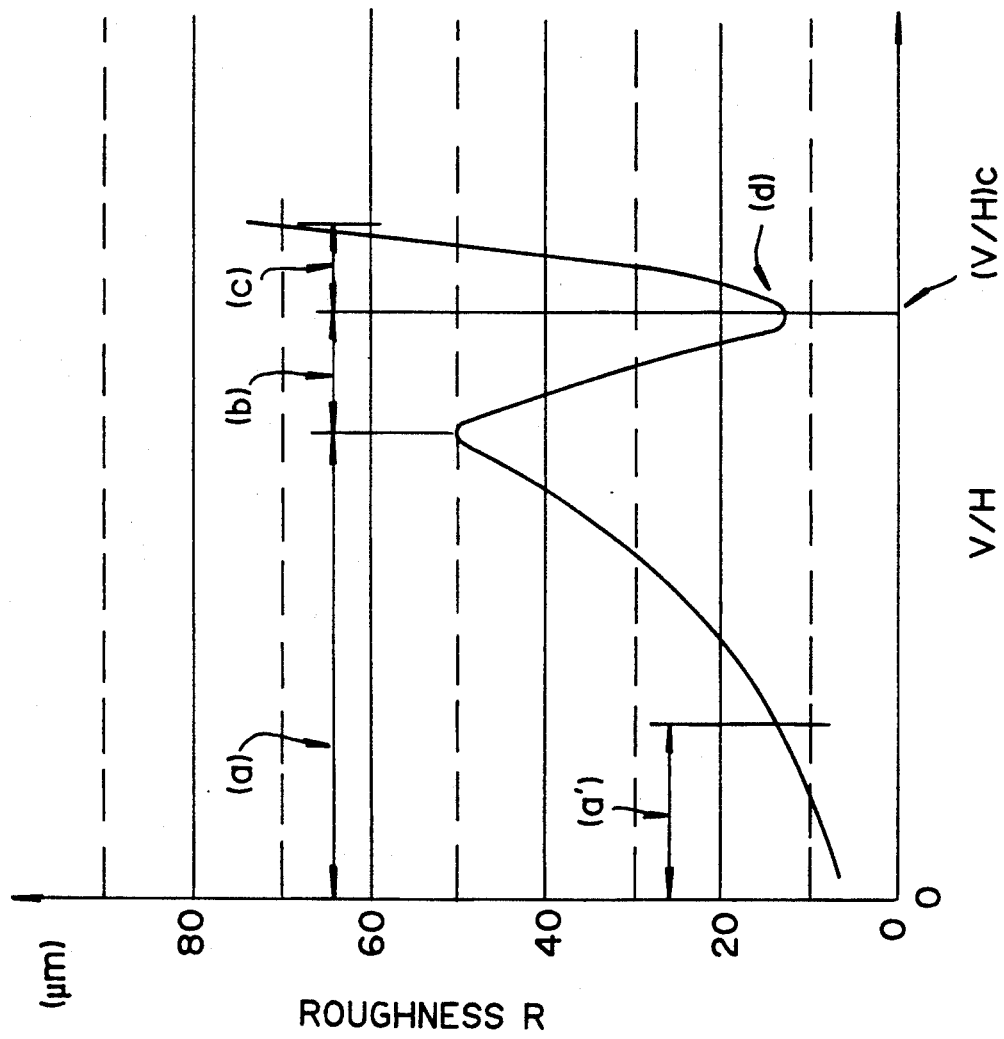
FIG. 1 is a graph showing the relationship between the value of the ratio V/H and the roughness R of the embossment formed on the surface of the sheet.

FIG. 1 shows the relationship between the ratio V/H of the extrusion velocity V of the resin to the slit width H and the roughness R of the embossment on the surface of the extruded sheet. The roughness R is measured in accordance with ISO R468, and the values thereof used here are mean values of the roughness measured at ten points on the sheet.

As shown by FIG. 1, as the value of V/H used during the extrusion of the molten resin through the slit is increased, the roughness R of the embossment formed on the surface of the sheet initially increases (region a in FIG. 1). However, if the value of V/H used during the extrusion of the molten resin through the slit is further increased, then the roughness R of the embossment on the surface of the sheet decreases abruptly, and drops to approximately 10–20 μm (region b in FIG. 1). Then, as the value of V/H used during the extrusion of the molten resin though the slit is increased still further, the roughness R of the sheet surface increases abruptly (region c in FIG. 1).

The form of the embossment created on the surface of the sheet in the aforesaid region a consists of a multitude of alternating long ridges and furrows perpendicular to the direction of extrusion of the sheet. The form of the embossment in region a could be described as undulant (wave-formed).

When sheet surfaces are embossed by the conventional embossing roller method, the sheets are fabricated under conditions corresponding to those of the region a, in such a manner that the roughness R is as small as possible (region a' of FIG. 1).

The form of the embossment created on the surface of the sheet in the aforesaid region b consists of the above-mentioned "waves" combined with a multitude of discontinuous non-oriented minute indentations and protuberances ("random" pattern). The roughness R of the embossment on the surface of the sheets obtained in region b decreases with an increase in the values of V/H. The value of V/H corresponding to the minimum value of the roughness R (point d in FIG. 1) is the critical value (V/H)c specified by the present invention.

Figure 4:
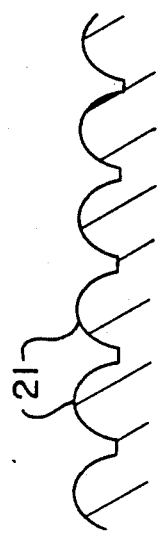
FIG. 4 is a cross-sectional view showing the form of the embossment on the surfaces of the sheets obtained by the method of the present invention.
Figure 5:
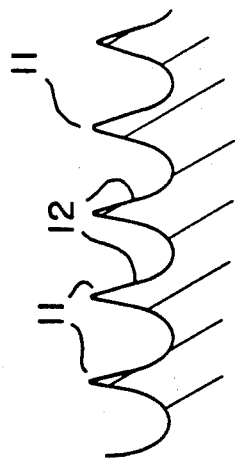
FIG. 5 is a cross-sectional view showing the form of the embossment on the surfaces of the sheets obtained by a conventional method.

The form of the embossment on the sheet surface in the aforesaid region c is entirely different from the undulant forms observed in regions a and b. The form of embossment created in region c consists entirely of multitudes of discontinuous unoriented minute indentations and protuberances ("random" form). Moreover, as shown in FIG. 4, the protuberances 11 of this embossment are sharply formed, while the indentations 12 are gentle. This type of "random" pattern facilitates the expulsion of air from the space between the thermoplastic resin sheet so obtained and the glass plates when the said sheet is interposed between glass plates and compressed to manufacture laminated glass. By contrast, as shown in FIG. 5, the protuberances of the embossment on sheets obtained by the conventional embossing roller method tend to be rounded in form, and therefore impede the escape of air.

By fabricating sheets under conditions where the ratio V/H assumes various values above the said critical value (V/H)c, the roughness R of the embossment formed on the surface of the sheet can be varied in the range of approximately 15–70 $\mu$m.

As mentioned above, if the sheet is formed by extrusion of molten thermoplastic resin through the slit of the mold at a value of V/H below the critical value (V/H)c (regions a and b of FIG. 1), then the embossment created on the surface of the sheet so obtained is principally of the undulant form. If thermoplastic resin sheets impressed with this type of embossment are used, for example, in the manufacture of laminated glass, then the escape of the air between the sheet and the glass plates is difficult. The reason for this difficulty is the fact that the undulant pattern of the embossment formed on the surface of the sheet has furrows oriented only in one direction, which does not readily permit the escape of the air from the space between the sheet and the glass plates.

By contrast, the pattern embossed on the surfaces of sheets fabricated under the conditions of region c is of the "random" type. The large number of indentations formed in this type of embossment pattern are mutually interconnected, and small furrows oriented in all directions on the surface are formed. Consequently, when lamination is effected by interposing the sheet between glass plates and applying pressure, the air is readily expelled from the space between the sheet and the glass plates.

In addition, by fabricating the sheets under conditions with various values of V/H in region c, the roughness R of the embossment formed on the sheet surface can be adjusted to a value in the range 15–70 $\mu$m, which is appropriate for use in the manufacture of laminated glass, or, more preferably, to a value in the range 20–50 $\mu$m.

Figure 2:
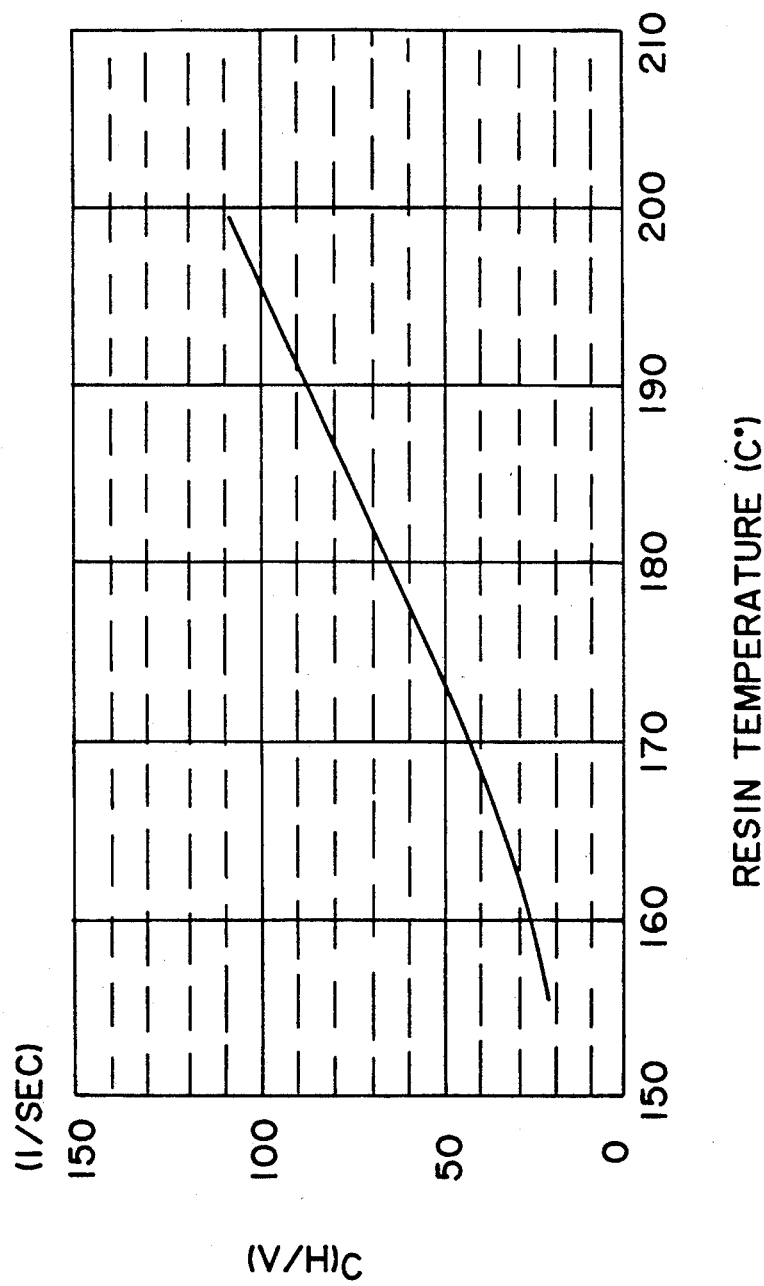
FIG. 2 is a graph showing the relationship between the resin temperature and the critical value (V/H)c in the manufacture of polyvinyl butyral sheets.

The critical value (V/H)c varies according to factors such as the type of thermoplastic resin used in the process as well as the viscosity of the resin and the resin temperature used during molding, etc. FIG. 2 shows the relationship between the critical value (V/H)c and the molding temperature for the case where the thermoplastic resin sheets are formed using polyvinyl butyral.

FIG. 2 indicates that the critical V (V/H)c increases with rising resin temperature. Therefore, if the resin temperature is high, then the width H of the slit in the mold should be correspondingly narrowed, and/or the extrusion velocity V of the molten resin correspondingly increased. By this way, in the method of the present invention, the value of the ratio V/H during the manufacture of the sheet exceeds the critical value (V/H)c and preferably does not exceed 1.4 times the said critical value (V/H)c, or more preferably, does not exceed 1.2 times the said critical value (V/H)c.

Figure 3:
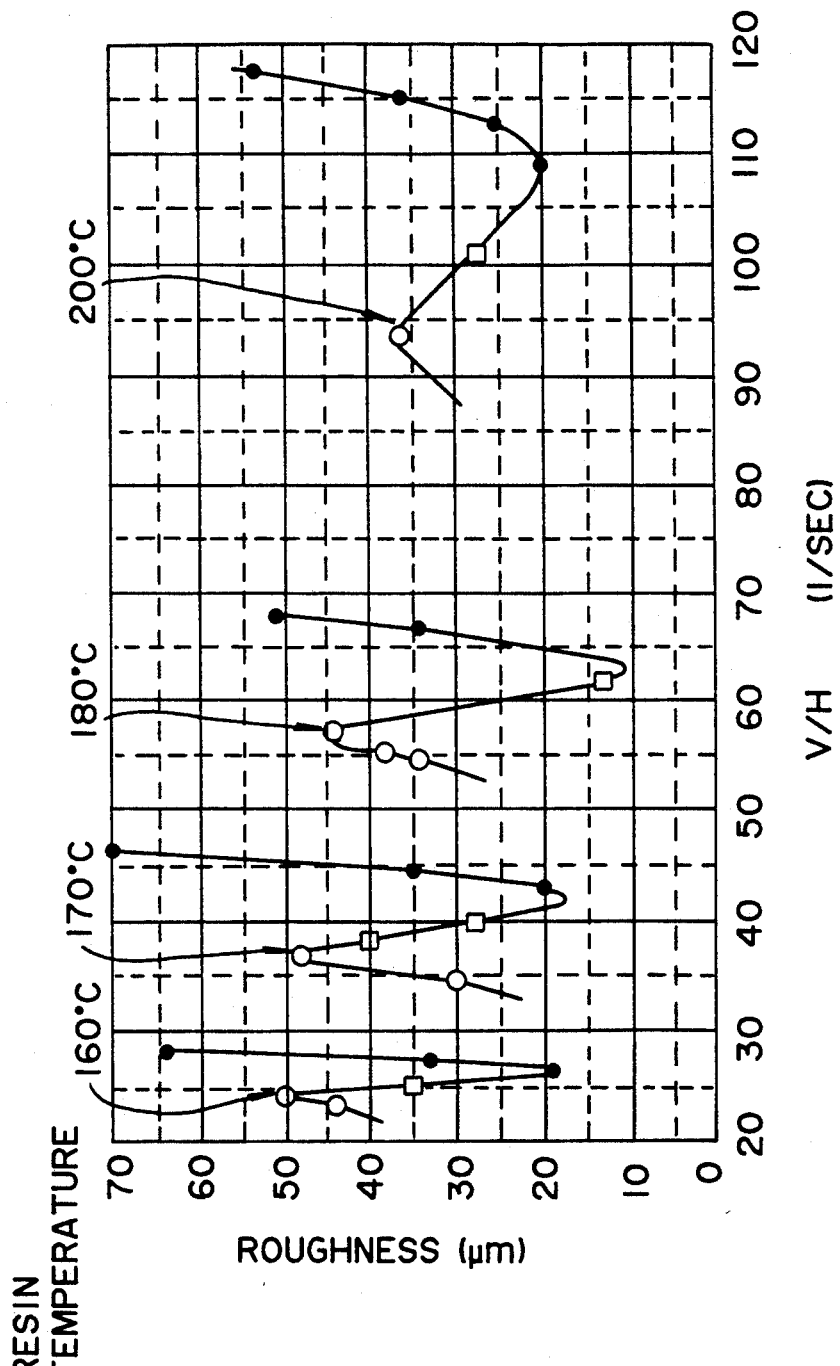
FIG. 3 is graph showing the relationships between the molding temperature of polyvinyl butyral, the value of V/H and the roughness R of the sheet surface.

FIG. 3 shows the relationships between the resin temperature of plasticized polyvinyl butyral, the ratio V/H and the roughness R of the embossment formed on the surface of the sheet. The white disks ○ in FIG. 3 represent the formation of "undulant" embossment patterns on the sheet surface, while the black disks ● "random" embossment patterns, and the white squares □ represent a mixture of "undulant" and "random" patterns. The data shown in FIG. 3 indicate that, in general, when sheets are formed from plasticized polyvinyl butyral in the temperature range of 150° to 220° C., a critical value (V/H)c exists, and, moreover, values of the ratio V/H exist which permit embossing with a desirable level of roughness R.

Therefore, according to the present invention, when sheets are formed by extrusion of molten resin from the slit of the mold at a prescribed temperature, several sheets are fabricated for various values of the ratio V/H, and the roughness R of the embossments on the surface of each of the sheets so obtained is measured. Then, the minimum of the roughness R is located by observing the value at which this roughness, after diminishing, again begins to increase, and the value of the ratio V/H is (i.e., the critical value (V/H)c) that corresponds to the value of the minimum of the roughness R is determined. If the thermoplastic resin is then extruded from the slit of the mold at a value of the ratio V/H exceeding the critical value (V/H)c determined in this manner, then, as described above, a thermoplastic resin sheet with the desired type of embossment is obtained. Conversely, if the ratio V/H has been fixed, then the resin temperature can be varied so that the critical value (V/H)c becomes smaller than this fixed value of V/H.

As the type of thermoplastic resin appropriate for use in the method of the present invention, any thermoplastic resin which possesses the property that the roughness R of the embossment formed on the surfaces of the sheets decreases and then subsequently increases when sheets are formed with the ratio V/H of the extrusion velocity V of the molten resin to the width H of the slit in the mold being progressively increased, as indicated in FIG. 1, i.e., any thermoplastic resin possessing a critical ratio (V/H)c, is applicable. For example, vinyl acetal resins such as polyvinyl butyral or other similar resins are appropriate for the present purpose.

As pointed out above, the method of the present invention requires no cooling of the mold slit, as is necessary in conventional techniques, and therefore the present method permits the preparation of thermoplastic resin sheets possessing embossments of desirable form by using ordinary general-purpose extrusion molds and suitably adjusting the relevant parameters such as the extrusion velocity of the molten resin and the width of the slit.

When polyvinyl butyral or similar tacky resins are extruded through the slit of a mold, the resin is prone to adhere to the orifice portion of the lips of the mold. Therefore in order to prevent this adhesion of resin, for example, as disclosed in Japanese Utility Model Publication No. 61-36349, cooling ducts can be inserted into the edge portion of the lips and the extruded sheets cooled by means of these ducts. The form and roughness R of the aforesaid embossment formed on the surface of the sheet are not affected by this method of cooling.

Figure 6:
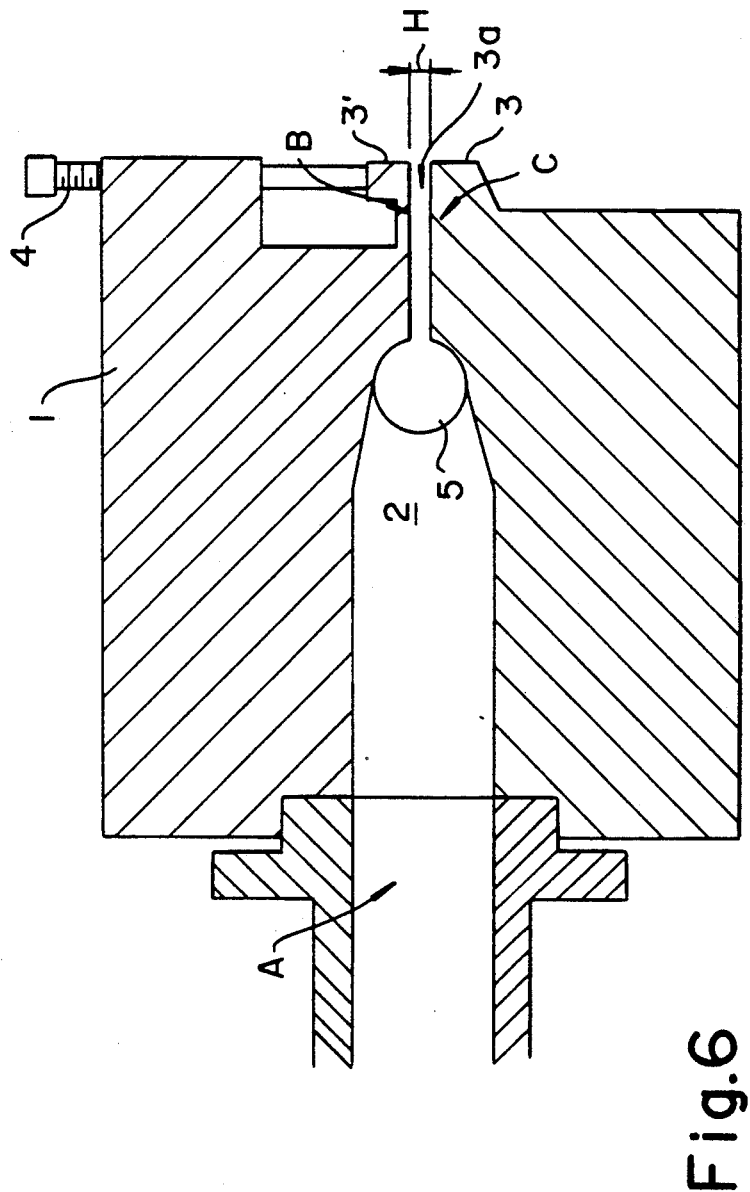
FIG. 6 is a cross-sectional diagram showing the main portion of the extrusion mold used for the formation of the flat sheet.

Moreover, in order to prevent adhesion of resin to the edges of the lips, the sheets should desirably be fabricated using a mold with the structure shown in FIG. 6. The mold 1 is provided with a slit 3a formed between a pair of lips 3 and 3'. The width H of the slit 3a is adjusted by means of an adjusting screw 4. A resin flow channel 2 is disposed within the mold 1. The reference numeral 5 is a manifold. The face 31 of the end of each lip 3 or 3' on the side contiguous with the resin flow channel 2 forms, as shown in FIG. 7, an angle of nearly 90° to the outside surface 32 of the lip. If this angle were to substantially exceed 90°, then the molten resin extruded from the slit 3a would be prone to adhere to the surface of the lip (the corner 33 and the outside surface 32), and as a result lip debris would be prone to form. On the other hand, if the angle were substantially less than 90°, then the molten resin extruded from the slit 3a would indeed have less opportunity for contact with the outside surfaces of the lips. However, in cases where the mold 1 is so arranged as to extrude resin in a downward direction, the lip debris adhering to the face 31 of the lip 3 contiguous with the resin flow channel 2 would flow downward along the lip surface under the force of gravity, and therefore lip debris would adhere to the thermoplastic resin sheet within a short period. Moreover, in this case, since the mechanical strength of the edge of the lip 3 is diminished, and the edge of the lip 3 is prone to deformation. Therefore, the angle α between the face 31 contiguous with the resin flow channel 2 and the outside surface 32 of the lip 3 should preferably be in the range of 89.0 to 91.0°, more preferably in the range of 89.7 to 90.3°, or still more preferably, 90°.

In the present invention, the fact that the corner 33 at the intersection of the face 31 contiguous with the resin flow channel 2 and the outside surface 32 of the lip 3 is not rounded nor bevelled implies that both the face 31 contiguous with the resin flow channel 2 and the outside surface 32 of the lip 3 form almost flat planes extending up to the very corner 33 of the lip 3. The distance L from the margin on the corner 33 side of the planar portion 31a of the face 31 contiguous with the resin flow channel 2 to the extension of the outside surface, as shown in FIG. 7, should be preferably not exceed 0.1 mm, or more preferably, should not exceed 0.05 mm. Similarly, the distance M from the margin on the corner 33 side of the planar portion 32a of the outside surface 32 of the lip 3 to the extension of the face 31 contiguous with the resin flow channel 2 should be preferably not exceed 0.1 mm, or more preferably, should not exceed 0.05 mm.

When the faces 31 and 32 of the lips 3 are finished by bevelling or buffing, the aforesaid distance L becomes 0.2-1.0 mm. If chipped or burred defects are present on the edge of the lip 3, then the formation of lip debris is concentrated at the sites of these defects, and therefore the size of these chipped or burred defects should be desirably not exceed the aforesaid distance L. The roughness of the faces 31 and 32 of the lip 3 is not subject to any particular restriction. However, in order to further enhance the inhibiting effect upon the formation of the aforesaid lip debris, this roughness should preferably not exceed, e.g., about 5 μm. The form and specifications of the upper lip 3' should be the same as that of the lower lip 3, as described above.

EXAMPLES 1-8 AND COMPARATIVE EXAMPLES 1-4

Flat sheets were prepared by the use of the extrusion mold of FIG. 6 mentioned above.

As shown in Table 1, embossed polyvinyl butyral sheets were obtained by extruding polyvinyl butyral through the slit of an extrusion mold at various resin temperatures, various values of the resin extrusion velocity V and various values of the width H of the slit.

The values of the ratio V/H shown in Table 1 were calculated from the actual measured values of the resin extrusion volume velocity, slit breadth and slit width, using the above-stated formula (1) for the calculation of V. The roughness R of the embossment of the sheets so obtained was measured in accordance with ISO R468, and the values given are the means of measurements performed at 10 points on the sheet. The critical values (V/H)c were determined from the relationship between the roughness R of the embossment on the surfaces of the sheets so obtained and the ratio V/H. The pattern embossed on the surfaces of the sheets was observed by eye.

TABLE 1

| | Resin temparatures °C. | V/H 1/sec | Critical values 1/sec | Roughness R μm | Patterns embossed |
|---|---|---|---|---|---|
| Examples | | | | | |
| 1 | 200 | 109 | 108 | 20 | Random |
| 2 | 200 | 118 | 108 | 53 | Random |
| 3 | 160 | 27.6 | 27 | 33 | Random |
| 4 | 160 | 28.6 | 27 | 64 | Random |
| 5 | 170 | 42 | 40 | 28 | Random |
| 6 | 170 | 44.6 | 40 | 35 | Random |
| 7 | 180 | 66.9 | 63 | 33 | Random |
| 8 | 180 | 68.3 | 63 | 51 | Random |
| Comparative Examples | | | | | |
| 1 | 200 | 94 | 108 | 36 | Undulant |
| 2 | 160 | 23.5 | 27 | 44 | Undulant |
| 3 | 170 | 34.8 | 40 | 30 | Undulant |
| 4 | 180 | 55 | 63 | 34 | Undulant |

The results obtained in connection with Examples 1-8 are shown in Table 1, from which it was confirmed that when the value of the ratio V/H exceeds the critical value (V/H)c, the sheets obtained are such that the roughness R of the embossment is suitable for the use as the intermediate layer in laminated glass, and moreover, the pattern of this embossment is of the "random" form.

EXAMPLE 9

Plasticized polyvinyl butyral sheets were formed by extrusion using the flat sheet extrusion mold shown in FIG. 4.

The width H of the slit was 0.1 cm and the extrusion velocity V was 9.2 cm/sec. The temperatures of various points of the resin and the mold 1 were measured by the use of a thermocouple. The temperature of the resin channel 2 (at the point indicated by the symbol A in FIG. 6) was 191° C. The temperature at a point of the upper lip 3' that is approximately 20 mm deep in the mold as reckoned from the outer edge of the lip 3' (indicated by the symbol B in FIG. 6) was 182° C., and the temperature at a point of the lower lip 3, situated 3 mm downstream of the resin channel and approximately 20 mm deep in the mold as reckoned from the outer edge of the lip 3 (indicated by the symbol C in FIG. 6) was 186° C.

The pattern embossed on the sheets so obtained was of the "random" type, and the roughness R of these embossments was 30 μm. In this example, the ratio V/H used in the preparation of the sheets was 92, which was greater than the critical value of 85 (for the resin temperature 191° C.), thus satisfying the condition specified by the present invention.

EXAMPLES 10-14

Thermoplastic resin sheets were obtained in the same manner as described in Example 1, except for the use of molds with varied distances L and M, as shown in Table 2. Fabrication of the said sheets was continued for a considerable length of time, the lips were cleaned when scraps of resin began to adhere to the edges of the lips, and the respective periods of time elapsed before each of two consecutive cleaning operations were recorded. The distances L and M for the bevelled lips of the molds used in Example 14 were both in the range of 0.2 to 1.0 mm. The above-mentioned periods of time recorded between the successive cleanings of the lips were represented as a ratio of cleaning cycles in Table 2. The data shown in Table 2 demonstrated that shortened distances L and M on the lips of the mold were associated with prolongation of the period between successive cleanings of the lips.

TABLE 2

| | Distances L and M on lips (mm) | Ratios of cleaning cycles |
| --- | --- | --- |
| Example 10 | both 0.005 | Approximately 3.5 |
| Example 11 | both 0.01 | Approximately 3.0 |
| Example 12 | both 0.5 | Approximately 2.5 |
| Example 13 | both 0.1 | Approximately 2 |
| Example 14 | both 0.2-1.0 | 1 |

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for the manufacture of polyvinyl butyral sheets comprising extruding molten polyvinyl butyral at an extrusion velocity V through a slot provided in an extrusion mold so as to form polyvinyl butyral sheets with embossed surfaces, wherein said polyvinyl butyral is extruded from said slit in said extrusion mold under conditions such that the ratio V/H of said extrusion velocity V to the width H of said slit exceeds a critical value (V/H)c, said critical value (V/H)c being the ratio of the extrusion velocity to the width of the mold slit at which the roughness of said embossment begins to increase after initially decreasing when said polyvinyl butyral sheet is fabricated under conditions where said ratio V/H is progressively increased.

2. A method according to claim 1, where the ratio V/H of said extrusion velocity V to said slit width H lies in the range exceeding said critical value (V/H)c but not exceeding 1.4 times said critical value (V/H)c.

3. A method according to claim 1, wherein the ratio V/H of said extrusion velocity V to said slit width H lies in the range exceeding said critical value (V/H)c but not exceeding 1.2 times said critical value (V/H)c.

4. A method according to claim 1, wherein the angle between the face contiguous with the resin flow channel and the outside surface of the end of a lip of said extrusion mold is approximately 90°, and the corner at the intersection of the face contiguous to said resin flow channel and the outside surface of said lip is not rounded nor bevelled.

* * * * *